(12) United States Patent
Jean

(10) Patent No.: US 8,927,938 B2
(45) Date of Patent: Jan. 6, 2015

(54) ALPHA-PARTICLE DETECTION DEVICE

(76) Inventor: Grégory Jean, Caen (FR)

( * ) Notice: Subject to any disclaimer, the term of this patent is extended or adjusted under 35 U.S.C. 154(b) by 217 days.

(21) Appl. No.: 13/698,498

(22) PCT Filed: May 26, 2011

(86) PCT No.: PCT/FR2011/051204
§ 371 (c)(1),
(2), (4) Date: Feb. 11, 2013

(87) PCT Pub. No.: WO2011/151575
PCT Pub. Date: Dec. 8, 2011

(65) Prior Publication Data
US 2013/0140466 A1      Jun. 6, 2013

(30) Foreign Application Priority Data

Jun. 3, 2010   (FR) ..................................... 10 54352

(51) Int. Cl.
*G01T 1/178* (2006.01)
*G01T 1/24* (2006.01)
*G01T 1/17* (2006.01)

(52) U.S. Cl.
CPC . *G01T 1/247* (2013.01); *G01T 1/17* (2013.01); *G01T 1/178* (2013.01)
USPC .................................................. 250/370.02

(58) Field of Classification Search
CPC ............. G01T 1/178; G01T 1/24; G01T 1/17; G01T 1/247; C01P 2006/44
USPC ..................................................... 250/370.02
See application file for complete search history.

(56) References Cited

U.S. PATENT DOCUMENTS

| 4,055,762 A * | 10/1977 | Durkin ........................... 250/253 |
| 4,859,854 A * | 8/1989 | Kershner et al. ............... 250/374 |
| 4,871,914 A * | 10/1989 | Simon et al. ............. 250/370.02 |
| 5,319,208 A | 6/1994 | Diamondis |
| 5,489,780 A | 2/1996 | Diamondis |
| 6,969,859 B2 * | 11/2005 | Klaasen et al. .......... 250/370.01 |

FOREIGN PATENT DOCUMENTS

FR              2919394 A1        1/2009

\* cited by examiner

*Primary Examiner* — David Porta
*Assistant Examiner* — Mindy Vu
(74) *Attorney, Agent, or Firm* — Drinker Biddle & Reath LLP

(57) ABSTRACT

A device for detecting alpha-particles, like those emanating from radon. The device includes an electronic circuit (100) having a detection/conversion cell (102) with a forward biased diode (D) with its n-type layer grounded and the input of which is electrically connected to the p-type layer of the diode (D). The cell is designed to recover the charge emitted by the diode (D) and to convert this charge into a representative voltage constituting a dosage signal. The device further includes a comparison circuit (160) designed to compare the level of the dosage signal with a threshold level, and a control circuit (170) to control a protection device in response to the level of the voltage (V) exceeding the threshold value.

4 Claims, 2 Drawing Sheets

ALPHA-PARTICLE DETECTION DEVICE

Figure 1:
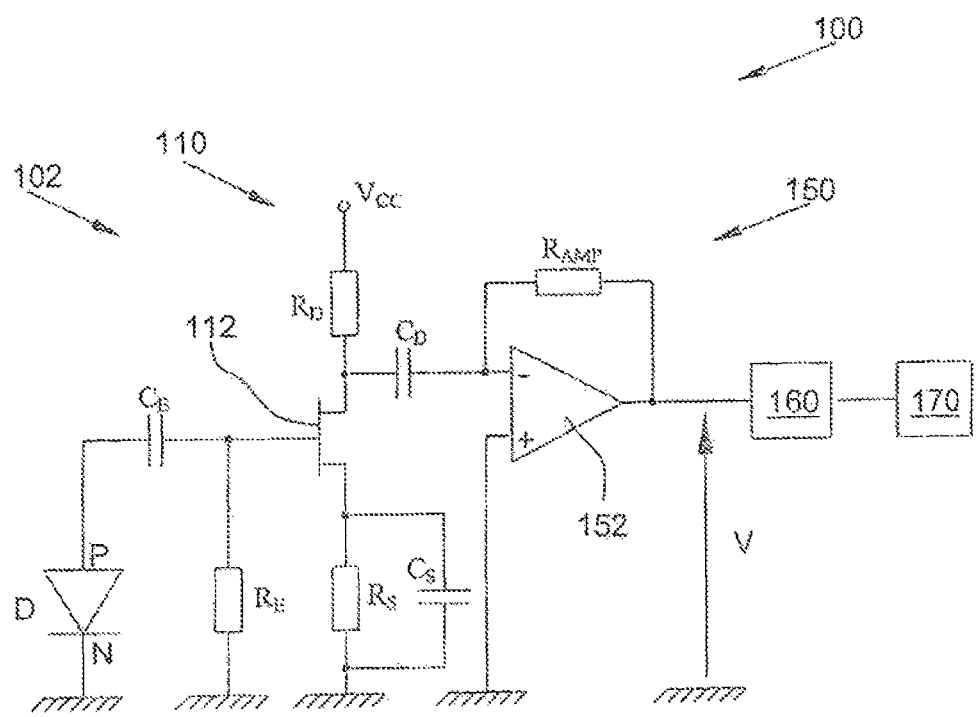

The present invention relates to a device for detecting alpha particles in the atmosphere.

Radon is a noble as of natural origin which forms a natural source of radioactivity. It is therefore important to be able to detect the presence of tins gas in the atmosphere, such as for example in a confined space as in a room of a house.

Radon emits alpha particles which can be detected by an appropriate sensor.

Various detection devices have already been proposed but none of them are completely satisfactory.

For example, there can be passive devices (film dosimeters with sensitive materials or charcoal) or active devices (ionization chambers). These devices are often bulky and cannot be used easily in a house.

Other detection devices use an electronic implementation which does not provide for detecting all alpha particles and, in particular, alpha particles with low interaction energy as well as alpha particles which have travelled through the air for several centimeters and lost energy.

An object of the present invention is to propose a device for detecting radon which does not exhibit the drawbacks of the prior art and which in particular provides for a more precise detection than that carried out by the detection devices of the prior art.

To this end, there is proposed a device for detecting alpha particles, for example from radon, comprising an electronic circuit, itself comprising:
  at least one detection and conversion cell, the or each detection and conversion cell comprising:
  a forward-biased diode with its N layer at ground, and
  a conversion circuit of the charge-voltage converter type, the input of which is electrically connected to the P layer of the diode and which is provided, to retrieve the charge emitted by the diode and to convert this charge into a representative voltage,
  an amplification circuit, to the input of which there is electrically connected, in parallel, the output of the or each conversion circuit,
  a comparison circuit provided to compare the value of the voltage at the output of the amplification circuit with a threshold value, and
  a control circuit provided to control a protection device, in response to the voltage value exceeding the threshold value.

Advantageously, the or each detection and conversion cell additionally comprises an input capacitor inserted between the P layer of the diode and the associated conversion circuit.

Advantageously, the or each detection and conversion cell additionally comprises an output capacitor inserted between the conversion circuit and the amplification circuit.

Advantageously, the or each conversion circuit comprises:
  a self-biased field effect transistor, the gate of which is electrically connected to the input capacitor and the drain of which is electrically connected to the output capacitor,
  an input resistance electrically connected between ground and the gate of the transistor,
  a source resistance which is electrically connected between ground and the source of the transistor,
  a source capacitor connected in parallel with the source resistance,
  a drain resistance electrically connected between a voltage source and the drain of the transistor.

Figure 2:
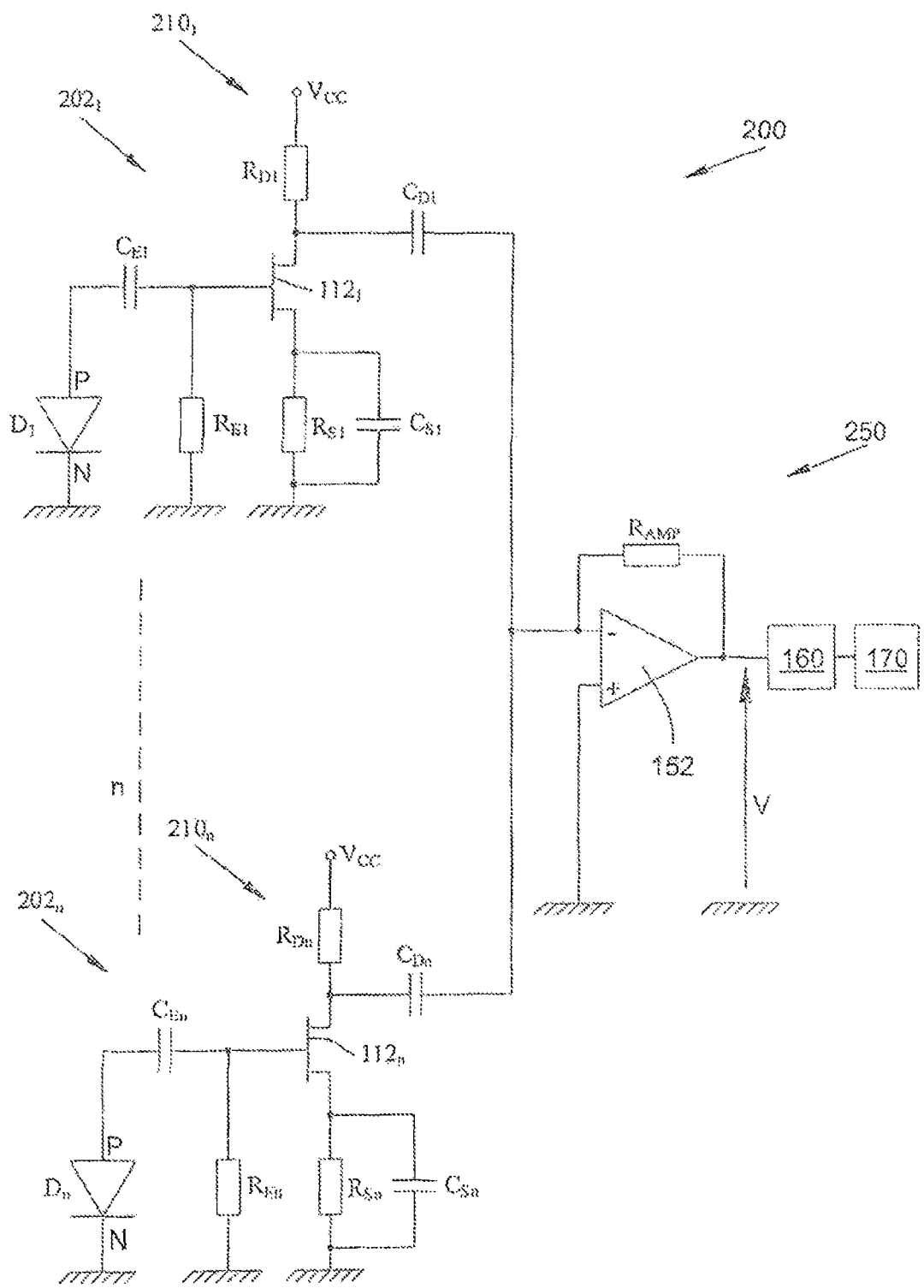

The abovementioned features of invention, as well as others, will become clearer upon reading the following description of an example embodiment, said description being made with reference to the appended drawings, in which:

FIG. 1 represents an electronic circuit of an alpha particle detection device according to a first embodiment of the invention, and FIG. 2 represents an electronic circuit of an alpha particle detection device according to a second embodiment of the invention.

An alpha particle interacts with the P layer of a diode. To this end, various types of diodes can be used; mention will be made, for example, of: "planar diffusion" diodes, "low-capacitance planar diffusion" diodes, PN diodes, PNN+ diodes, PIN diodes, etc.

FIG. 1 shows an electronic circuit 100 of a detection device which includes a detection and conversion cell 102. The detection device provides for detecting alpha particles which stem from, for example, radon.

The detection and conversion cell 102 includes such a diode D which is forward-biased and which is therefore not subjected to any biasing voltage or current.

The P layer of the diode D is oriented towards the air in which radon is to be detected and the N layer is connected to ground.

The detection and conversion cell 102 also includes a conversion circuit 110 of the charge-voltage converter type which is provided to retrieve the charge emitted by the diode D—when an alpha particle is picked up by the diode D—and to convert this charge into a representative voltage.

The P layer of the diode D is electrically connected to the input of the conversion circuit 110.

This representative voltage is then amplified into a voltage V by an amplification circuit 150 which is electrically connected to the output of the conversion circuit 110.

The electronic circuit 100 also includes a comparison circuit 160 which compares the value of the voltage V at the output of the amplification circuit 150 with a threshold value.

The detection device also includes a control circuit 170 which, in response to the voltage V, detected by the comparison circuit 160, exceeding the threshold value, controls a protection device which can take the form of an audible and/or luminous alarm and/or a ventilation system intended to evacuate the radon present in the atmosphere.

The area of interaction between the alpha particles and the diode D is placed in the P layer. This area of interaction, called "depletion region", is obtained as a function of the biasing of the diode D. And since no voltage, no current and no electric field is applied on the diode D, only the P layer is sensitive to the presence of alpha particles.

The P layer is very thin, in the order of 10 µm, and thus only alpha particles emitted by radon which have a quite short mean free path (about 8 µm in silicon) interact with the P layer.

Moreover, this area of interaction is limited, thereby providing for reducing the sensitivity to radioactive elements which are deposited on the P layer of the diode D and which can emit alpha particles. Thus, disturbances created by natural contamination of the detector (for example, by the fission products of radon) are substantially less pronounced than in the case of detection devices of the prior art.

Furthermore, by debiasing the diode D, it is possible to electrically connect it directly, i.e. to electrically connect the P layer to the input of the conversion circuit 110.

In the embodiment of the invention presented in the drawings, the amplification circuit 150 comprises:
  a voltage amplifier 152, the non-inverting input (+) of which is at ground, and the inverting input (−) is electrically connected with the conversion circuit 110, and a resistance $R_{AMP}$ which is electrically connected between the inverting input (−) and the output of the voltage amplifier 152.

The voltage amplifier 152 is in this case connected in inverting mode, but it can be in non-inverting mode.

Likewise, the amplification circuit 150 can be produced by a series of amplification transistors or any other amplification system.

To electrically separate the diode D and the conversion circuit 110, and thus fully debias the diode D, the electronic circuit 100 includes an input capacitor $C_E$ inserted between the P layer of the diode D and the conversion circuit 110. Thus, the first electrode of the input capacitor $C_E$ is electrically connected to the P layer of the diode D and its second electrode is electrically connected to the input of the conversion circuit 110.

Such an arrangement with the forward-biased diode D, the conversion circuit 110 and the input capacitor $C_E$ provides for detecting pulses representative of a diode D/alpha particle interaction which is weaker than that which is measured using a charge amplifier of the prior art. Indeed, such an arrangement provides for markedly reducing the electronic noise of the amplification circuit 150 and it is possible to detect the very weak pulses of the electronic noise.

Similarly, to electrically separate the conversion circuit 110 and the amplification circuit 150, the electronic circuit 100 includes an output capacitor $C_D$ inserted between the conversion circuit 110 and the amplification circuit 150. Thus, the first electrode of the output capacitor $C_D$ is electrically connected to the output of the conversion circuit 110, and its second electrode is electrically connected to the input of the amplification circuit 150.

The conversion circuit 110 comprises:
- a self-biased field effect transistor or FET 112,
- an input resistance $R_E$ which is electrically connected between ground and the gate of the FET transistor 112,
- a source resistance $R_S$ which is electrically connected between ground and the source of the FET transistor 112,
- a source capacitor $C_S$ which is connected in parallel with the source resistance $R_S$,
- a drain resistance $R_D$ which is electrically connected between a voltage source $V_{CC}$ and the drain of the FET transistor 112.

The second electrode of the input capacitor $C_E$ is electrically connected to the gate of the FET transistor 112.

The first electrode of the output capacitor $C_D$ is electrically connected to the drain of the FET transistor 112.

The particular arrangement of the conversion circuit 110 provides for when an alpha particle interacts with the P layer, the creation of a movement of charge at the gate of the FET transistor 112, thereby bringing about a slight modification in the voltage between the gate and the source of the FET transistor 112 and generating a variation in voltage on the drain resistance $R_D$ which is then amplified by the amplification circuit 150.

FIG. 2 shows an electrical circuit 200 of a detection device which includes a plurality of detection and conversion cells labelled $202_1$, $202_n$ and which are electrically connected in parallel on the input of an amplification circuit 250 which is followed by a comparison circuit 160 and a control circuit 170.

The amplification circuit 250 assumes the same structure as that of the amplification circuit 150 of the embodiment of FIG. 1.

The number 'n' represents an integer greater than 2 and it represents the number of detection and conversion cells $202_1$, $202_n$ which are put in place.

The case where 'n' is equal to 1 is represented by the embodiment of the invention of FIG. 1.

Only the detection and conversion cell $202_1$ will now be described, but each of the other detection and conversion cells exhibit an identical structure.

The detection and conversion cell $202_1$ includes:
- a forward-biased diode $D_1$, and
- a conversion circuit $210_1$ of the charge-voltage converter type, the input of which is electrically connected to the P layer of the diode $D_1$ and which is provided to retrieve the charge emitted by the diode $D_1$ and to convert this charge into a representative voltage.

As in the embodiment of FIG. 1, the detection and conversion cell $202_1$ includes an input capacitor $C_{E1}$ inserted between the P layer of the diode $D_1$ and the associated conversion circuit $110_1$, i.e. the first electrode is electrically connected to the P layer of the diode $D_1$ and the second electrode is electrically connected to the input of the conversion circuit $210_1$.

As in the embodiment of FIG. 1, the detection and conversion cell $202_1$ also includes an output capacitor $C_{D1}$ inserted between the conversion circuit $210_1$ and the amplification circuit 250, i.e. the first electrode is electrically connected to the output of the conversion circuit $210_1$, and the second electrode is electrically connected to the input of the amplification circuit 250.

The structure of the conversion circuit $210_1$ is identical to that of the conversion circuit 110 of FIG. 1. That is to say, it comprises:
- a self-biased field effect transistor $112_1$,
- an input resistance R is electrically connected between ground and the gate of the transistor $112_1$,
- a source resistance $R_{S1}$ which is electrically connected between ground and the source of the transistor $112_1$,
- a source capacitor $C_{S1}$ which is connected in parallel with the source resistance $R_{S1}$, and
- a drain resistance $R_{D1}$ which is electrically connected between a voltage source $V_{CC}$ and the drain of the transistor $112_1$.

The second electrode of the input capacitor $C_{E1}$ is electrically connected to the gate of the transistor $112_1$.

The first electrode of the output capacitor $C_{D1}$ is electrically connected to the drain of the transistor $112_1$.

As is shown in the case of the embodiment of the invention of FIG. 2, the particular an of each detection and conversion cell $202_1$, $202_n$ provides for multiplying the number of these cells for a given amplification circuit 250 and thus for increasing the sensitivity of the detection device 200 without it being necessary to significantly increase its volume and its electrical consumption.

The sensitivity of the detection device 200 thus obtained is similar to that of radiation meter equipment for a lower cost.

According to a particular embodiment of the invention, the transistor 112 is a transistor referenced J113. The resistance values $R_D$ and $R_S$ are between 50 kΩ and 470 kΩ and preferably close to 300 kΩ. An example voltage amplifier 152 able to be used is the voltage amplifier referenced TL031.

Of course, the present invention is not limited to the examples and embodiments described and represented, but it is open to a number of variants accessible to the person skilled in the art.

The invention has more particularly been described in the case of alpha particles from radon, but it similarly applies to alpha particles from other elements.

The invention claimed is:

1. A device for detecting alpha particles, notably from radon, in a room, formed by an electronic circuit comprising:
   a detection and conversion cell or several detection and conversion cells connected in parallel, this or each of these cell(s) including a forward-biased diode cooperating with analysis means which deliver a dosing signal representative of the quantity of alpha particles in the room,
   a comparison circuit provided to compare the value of the dosing signal obtained at the output of the detection and conversion cell or cells with a threshold value, and
   a control circuit provided to control a protection device in response to the dosing signal exceeding the threshold value, characterized in that
   the N layer of the diode is connected to ground, and
   the analysis means are formed by a conversion circuit of the charge voltage converter type, the input of which is electrically connected to the P layer of the diode so as to retrieve the charge emitted by this diode and convert it into a representative voltage forming the dosing signal, this conversion circuit comprising:
      a self-biased field effect transistor, the gate of which is electrically connected to the P layer of the diode and the drain of which is electrically connected to the comparison circuit,
      an input resistance electrically connected between ground and the gate of the transistor,
      a source resistance electrically connected between ground and the source of the transistor,
      a source capacitor connected in parallel on the source resistance, and
      a drain resistance electrically connected between a voltage source and the drain of the transistor.

2. An alpha particle detection device according to claim 1, characterized in that
   it includes an amplification circuit electrically connected between the output of the detection and conversion cell or cells, and the input of the comparison circuit.

3. An alpha particle detection device according to claim 1, characterized in that
   the or each detection and conversion cell(s) comprises an input capacitor inserted between the P layer of the diode and the associated conversion circuit.

4. An alpha particle detection device according to claim 1, characterized in that
   the or each detection and conversion cell(s) comprises an output capacitor inserted between the output of the conversion circuit and the comparison circuit or the amplification circuit.

\* \* \* \* \*